July 17, 1956   R. S. FRENCH   2,754,730
MOLDED FIBER-RESIN ARTICLE AND METHOD OF MAKING
Filed Jan. 28, 1954   2 Sheets-Sheet 1

INVENTOR.
RICHARD S. FRENCH
BY
*Connolly and Hutz*
HIS ATTORNEYS

July 17, 1956  R. S. FRENCH  2,754,730
MOLDED FIBER-RESIN ARTICLE AND METHOD OF MAKING
Filed Jan. 28, 1954  2 Sheets-Sheet 2

INVENTOR.
RICHARD S. FRENCH
BY
HIS ATTORNEYS

United States Patent Office 2,754,730
Patented July 17, 1956

2,754,730

MOLDED FIBER-RESIN ARTICLE AND METHOD OF MAKING

Richard S. French, Waterville, Maine, assignor to Keyes Fibre Company, Portland, Maine, a corporation of Maine Application January 28, 1954, Serial No. 406,703

4 Claims. (Cl. 92—55)

The present invention relates to articles molded from mixtures of fiber and resin, and more particularly to such articles that are of relatively large size.

Among the objects of this invention is the provision of novel molded fiber-resin articles having improved strength. Other objects of the present invention include a novel process for making such articles.

The above, as well as still further objects of the present invention, will be more readily understood from the following description of several of its exemplications, in conjunction with the accompanying drawings wherein.

Figure 1:
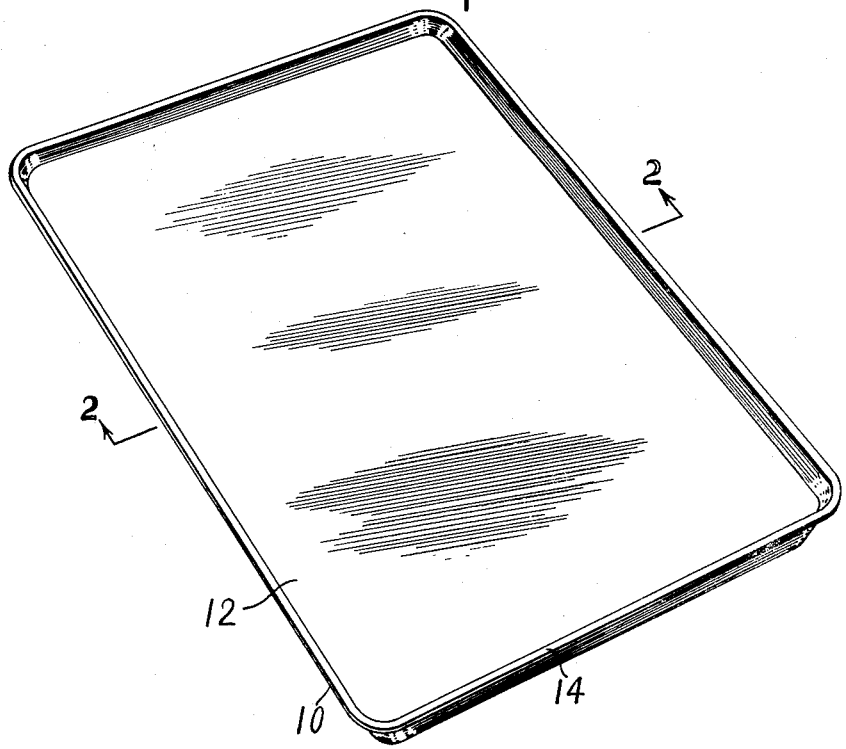
Fig. 1 is a perspective view of a tray illustrating the present invention.

According to the present invention a laminated article is molded in such a manner that the surface laminations contain about 50% to 70% by weight of phenol-formaldehyde or other phenolic resin, about 2 to 10% by weight of an elastomer such as neoprene or a copolymer of butadiene-1,3 and acrylonitrile, the balance of the surface laminations being essentially fiber. The central lamination may have the same compositions, but generally contains smaller amounts of the phenolic resin.

It has been discovered that articles made with the above formulation are exceptionally durable and have a very high surface hardness yet are extremely resistant to shock, particularly when the fibers are in wet-felted form.

A correspondingly shock-resistant laminated article can also be made by having the center lamination or laminations of corresponding formulations. Here, however, the proportion of fiber to resin is preferably increased. As little as 20 to 50% by weight phenolic resin, and 2 to 6% by weight of an elastomer, the balance being fiber, makes an effective product when used in the central laminations.

Best results are obtained when the laminations are wet molded from a slurry of fibers and resin in a suitable liquid such as water. This produces a wet-felted fiber structure that is particularly strong after the hot molding of the laminations to set and cure the resin. The resin is preferably suspended in the slurry as undissolved particles that are uncured and flowable to some degree under the temperatures and pressures of the final hot molding operation. The resin particles may be formed by milling at elevated temperatures below the temperatures at which curing will occur, as is, for example, illustrated in U. S. Patent No. 2,459,739, dated January 18, 1949. If desired, however, the phenolic resin can be partially or completely dissolved in the slurry and can even be impregnated into a lamination that is wet-molded from a slurry that contains little or no phenolic resin.

For the best wet molding results it appears to be essential to have the copolymer added to the slightly alkaline slurry as an emulsion of not more than about 10% by weight of uncured particles in the slurry dispersant and after a small amount of mixing to promptly coagulate or precipitate the resins by the addition of papermaker's alum (aluminum sulfate) to bring the pH to about 4.5 to 5.

One example of the butadiene-1,3-acrylonitrile copolymer used in accordance with the present invention can be made from equal parts by weight of the mixed monomers by emulsion polymerization in water, or by other conventional methods. The resulting aqueous emulsion can be directly used, although it can also be stored indefinitely. For storage purposes it is advantageous to add an antioxidant to the emulsion; a small amount of p-amino diphenylamine such as 0.1% by weight of resin is suitable. The copolymer generally has an average molecular weight of between 10,000 and 100,000, but higher molecular weights are satisfactory.

The neoprene can be similarly provided by emulsion polymerization of 2-chloro-1,3-butadiene.

Figure 3:
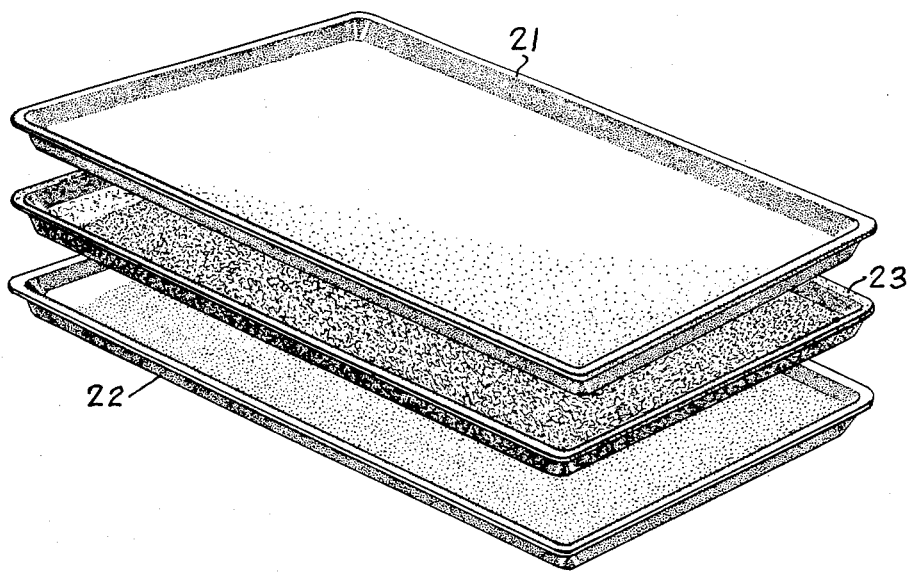
Fig. 3 is an exploded perspective view showing a step in the making of the tray of Fig. 1.

Referring to the drawings, Fig. 1 shows a fiber-resin tray 10 of a type suitable for use in cafeterias and the like. It has a generally flat body portion 12 surrounded by inclined walls 14, all integrally formed as by the process described in U. S. Patent No. 2,274,095 granted February 24, 1942. In the formation several preformed laminations, at least three as illustrated in Fig. 3, are wet molded from aqueous slurries of fiber, phenolic resin and copolymer. The outer or surface lamination 21, 22 preferably have 50 to 70% phenolic resin, 2 to 4% copolymer, the balance being fibers such as unbleached sulfate pulp, ground wood, unbleached sulfite pulp, unbleached soda pulp or mixtures of any two, three or all four of these pulps. The remaining or internal laminations, a single one 23 being shown in Fig. 3, preferably have less resin, about 20 to 50% phenolic and 2 to 6% copolymer, with the remainder fibers as above.

Optimum results are obtained withe the following formulations:

|  | Phenolic | Copolymer | Fiber |
| --- | --- | --- | --- |
| External laminations | 65 | 3 | balance. |
| Internal laminations | 30 | 5 | Do. |

All laminations, as shown in Fig. 3, can be shaped in the tray-like form of the final product, although they can also be in any other form if the ultimate in rigidity is not too important. Even flat preformed laminations can be used if desired. Regardless of how formed, the preforms are assembled in their proper relationship and hot molded between suitable shaped dies at a temperature of 250° to 350° F. and a pressure of about 2,000 to 6,000 pounds per square inch. Once during the pressing, preferably after about the first five seconds, the pressure should be momentarily relieved to about five pounds per square inch in order to release gases developed in the molding charge. More uniform results are obtained if just before curing the laminations have a moisture content in equilibrium with a 70% humidity at 30° C. (two days' storage under these conditions is usually sufficient). The complete cure takes about 3 to 5 minutes of molding. Less molding time is required if the mold charge is preheated just before it is inserted in the mold. Best results are obtained if the preheating is effected dielectrically with heating energy supplied at about ten megacycles per second and the preheating brings the charge close to molding temperature.

Figure 2:
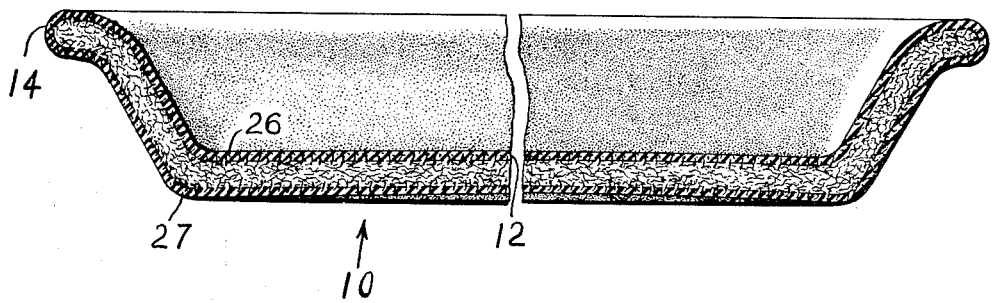
Fig. 2 is a sectional view of the tray of Fig. 1 taken along the line 2—2.

The final article 10 has the construction illustrated in Fig. 2. Its body 12 and walls 14 have surfaces 26, 27 with a high resin content corresponding to the outer preform laminations, and an inner portion of lower resin content corresponding to the internal lamination. By arranging for the internal lamination or laminations to be somewhat smaller than the outer ones, the higher resin skin 26, 27 can be made to extend entirely around the edges of the tray 10 so that no resin-lean portion is exposed. Alternatively the surface preforms can be made slightly heavier than needed for the final product so that some of these preforms are caused to flow out of the margins of the mold charge and unite around the periphery of the internal lamination.

The finished tray has a very hard surface and is extremely strong, rigid and resistant to shock. It can be dropped on a corner from a height of five feet onto a concrete floor without cracking or noticeably weakening. Without the copolymer, dropping under these conditions invariably develops a crack. The inclusion of the copolymer causes only a very slight and insignificant decrease in surface hardness.

The advantages of the present invention are obtained where a special high-resin surface lamination is used on only one of the surfaces of the final article, or even where the entire article is of uniform composition throughout. Furthermore, the laminations can be made in different manners, as from sheets of thin (0.003 to 0.050 inch thick) paper that are impregnated with resin in liquid (dissolved or suspended) form. The preforms can also be made from a resin-containing slurry and, after being so formed, fortified with additional resin by such impregnation.

Articles other than trays can also be made in accordance with the present invention. Examples of such articles where the added shock resistance is desirable are radio and television cabinets or sub-housings, structural members such as window runners and guides, and mechanical members such as gears, pulleys, wheels, etc.

In general the articles made in accordance with the present invention can be of any desired shape such as dished or concave, circular, elliptical, triangular, polygonal, or even flat or thick solid or hollow configurations. The advantages of the invention will be realized with any kind of structure that can be molded with or without the use of mold inserts.

As many apparently widely different embodiments of this invention may be made without departing from the spirit and scope hereof, it is to be understood that the invention is not limited to the specific embodiments hereof except as defined in the appended claims.

What is claimed is:

1. A proces for making a laminated fiber-resin article, which process includes the steps of preparing an aqueous slightly alkaline slurry of fibers and suspended finely divided phenolic resin having about 20 to 50% resin by weight based on the total solid content, adding to the furnish an aqueous emulsion of a copolymer of butadiene and acrylonitrile in approximately equal proportions, said emulsion having a concentration of not over about 10% by weight to produce a final mixture having about 20 to 50% phenolic resin and about 4 to 6% copolymer based on the total solid content, promptly precipitating both resin and copolymer on the fibers by the addition of paper-makers alum, wet felting core laminations for the desired article from the resulting furnish, wet felting surface laminations from a correspondingly prepared furnish having between about 50 to 70% by weight of phenolic resin and about 2 to 4% copolymer and hot molding the surface and core laminations together.

2. A laminated, molded fiber-resin article having surface laminations at opposite sides of a core, said surface laminations consisting of about 50 to 70% by weight of phenolic resin and about 2 to 10% by weight of an elastomer selected from the group consisting of neoprene and a copolymer of approximately equal proportions by weight of butadiene and acrylonitrile, the remainder being essentially fiber, and said core consisting of about 20 to 50% by weight of phenolic resin and about 2 to 10% by weight of an elastomer selected from the group consisting of neoprene and a copolymer of approximately equal proportions by weight of butadiene and acrylonitrile, the remainder being essentially fiber, the amount of phenolic resin in said surface laminations being greater than the amount of phenolic resin in said core.

3. The article of claim 2 wherein the amount of phenolic resin in said surface laminations is approximately twice as great as the amount of phenolic resin in said core.

4. The article of claim 2 wherein the amount of elastomer in the surface laminations is about 2 to 4% by weight and wherein the amount of elastomer in the core is about 2 to 6% by weight, the amount of elastomer in said core being greater than the amount of elastomer in said surface laminations.

References Cited in the file of this patent

UNITED STATES PATENTS

| | | |
|---|---|---|
| 2,371,313 | Rast et al. | Mar. 13, 1945 |
| 2,459,739 | Groten et al. | Jan. 18, 1949 |
| 2,484,047 | Perry | Oct. 11, 1949 |
| 2,563,897 | Wilson et al. | Aug. 14, 1951 |
| 2,601,597 | Daniel et al. | June 24, 1952 |